(12) United States Patent
Harknett et al.

(10) Patent No.: US 11,527,977 B2
(45) Date of Patent: Dec. 13, 2022

(54) GENERATOR SYSTEM LINK BOARD ASSEMBLY TO FACILITATE A SELECTED VOLTAGE OUTPUT

(71) Applicant: CLARK EQUIPMENT COMPANY, Statesville, NC (US)

(72) Inventors: Nicholas Harknett, Statesville, NC (US); Robert Ranker, Statesville, NC (US)

(73) Assignee: CLARK EQUIPMENT COMPANY, Statesville, NC (US)

( * ) Notice: Subject to any disclaimer, the term of this patent is extended or adjusted under 35 U.S.C. 154(b) by 0 days.

(21) Appl. No.: 17/115,527

(22) Filed: Dec. 8, 2020

(65) Prior Publication Data

US 2021/0175824 A1 Jun. 10, 2021

Related U.S. Application Data

(60) Provisional application No. 62/945,631, filed on Dec. 9, 2019.

(51) Int. Cl.
 *H02P 9/30* (2006.01)
 *F02B 63/04* (2006.01)
 *H02P 101/25* (2016.01)

(52) U.S. Cl.
 CPC ............ *H02P 9/305* (2013.01); *F02B 63/042* (2013.01); *F02B 63/048* (2013.01); *H02P 2101/25* (2015.01)

(58) Field of Classification Search
 CPC .... H02P 9/305; H02P 2101/25; F02B 63/042; F02B 63/048
 See application file for complete search history.

(56) References Cited

PUBLICATIONS

Marathon Electric "MagnaPlus Generator 280-430 Frame Installation, Operation, and Maintenance Manual", Dec. 2017 (Year: 2017).*
Link Board Diagrams for Marathon Electric MagnaPlus Generator 280-430 (Year: 2017).*

* cited by examiner

*Primary Examiner* — Sean Gugger
(74) *Attorney, Agent, or Firm* — Michael Best & Friedrich LLP

(57) ABSTRACT

A portable electrical generation system includes a generator having a rotor and a plurality of stators to produce a supply of electrical energy, a prime mover operable to drive the rotor, a voltage selector control operably connected to the generator, and a link board assembly configured to removably engage the voltage selector control, the link board assembly including a base board and a plurality of bus bars, the bus bars being arranged to electrically orient the plurality of stators to provide a first power output configuration.

20 Claims, 5 Drawing Sheets

GENERATOR SYSTEM LINK BOARD ASSEMBLY TO FACILITATE A SELECTED VOLTAGE OUTPUT

CROSS-REFERENCE TO RELATED APPLICATIONS

This application claims priority to U.S. Provisional Patent Application No. 62/945,631, filed on Dec. 9, 2019 and titled "GENERATOR SYSTEM LINK BOARD ASSEMBLY TO FACILITATE A SELECTED VOLTAGE OUTPUT," the contents of which is herein incorporate by reference in its entirety.

FIELD

The present disclosure relates to a generator system. More specifically, the disclosure relates to a removable link board assembly for a mobile generator system that reconfigures the generator system to produce a selected output voltage.

BACKGROUND

Mobile or portable generators are generally known in the art. A mobile generator is a portable device configured to selectively produce electricity. The mobile generator is often powered by an engine. In some mobile generators, the engine can be configured to operate using a single fuel source, or multiple, different fuel sources. Mobile generators can provide electricity in various power output configurations, for example in single phase or multiple phase configurations. In various applications, a mobile generator can provide one or more than one output configurations.

SUMMARY

In one embodiment, this disclosure provides a portable electrical generation system that includes a generator having a rotor and a plurality of stators to produce a supply of electrical energy, a prime mover operable to drive the rotor, a voltage selector control operably connected to the generator, and a link board assembly configured to removably engage the voltage selector control, the link board assembly including a base board and a plurality of bus bars, the bus bars being arranged to electrically orient the plurality of stators to provide a first power output configuration.

Other aspects of this disclosure will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
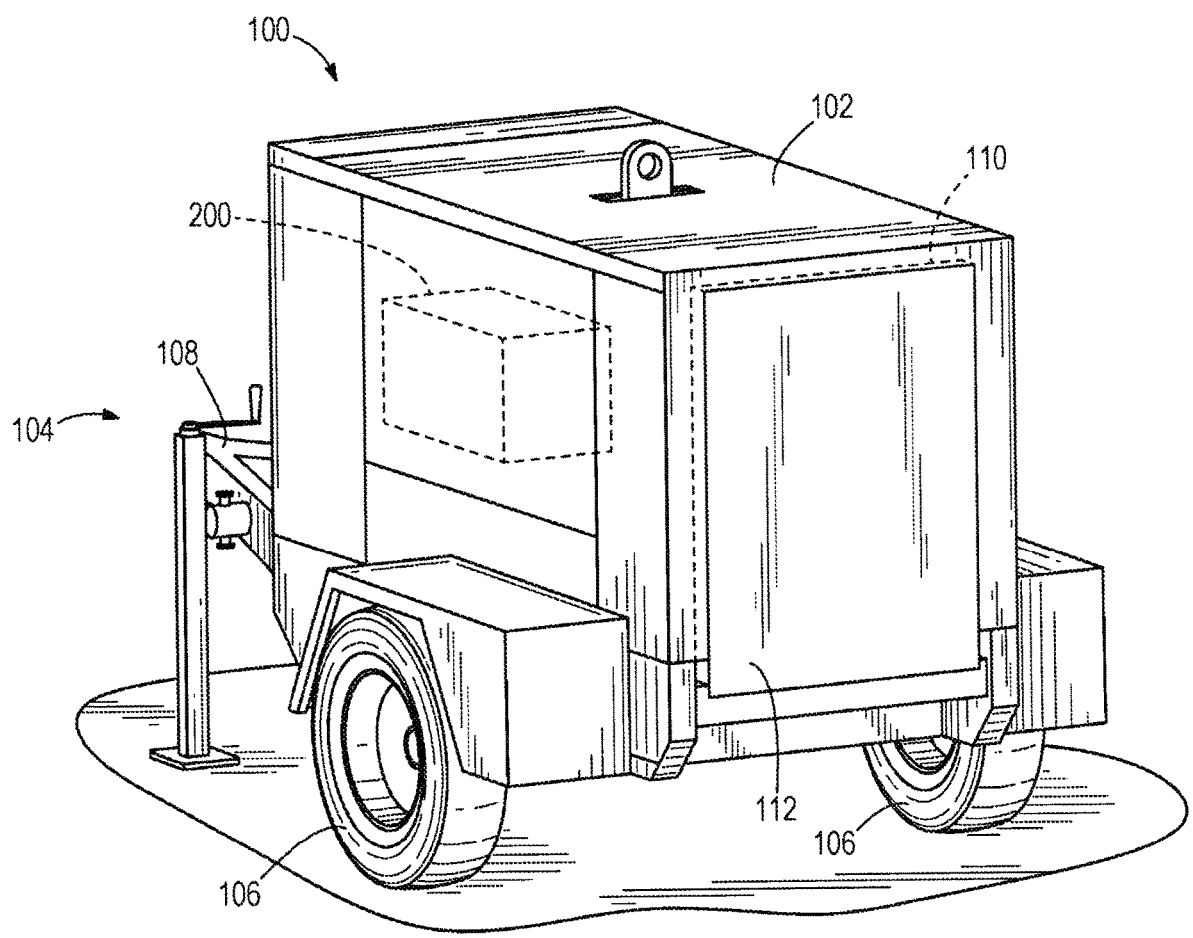
FIG. 1 is a perspective view of an embodiment of a portable power source.

FIG. 1 illustrates an embodiment of a mobile or portable power source 100. For the purposes of this disclosure, the terms mobile and portable, when applied to a power source mean essentially the same thing: that a power source so described is intended to be moved from one location to another as may be needed or desirable. Such a power source may be sized to be easily carried or towed under human power or, as is the case of power source 100, towed by a vehicle. The portable power source 100 can be a mobile electrical generation system. The portable power source 100 is configured to be moveable to a desired (or targeted) location for the generation of electricity (or electrical power). The portable power source 100 can be implemented as, for example, a mobile generator or a portable generator, a construction or rental generator, a mobile light tower, or an onboard power generator.

The portable power source 100 includes a housing 102. The housing 102 provides a frame structure to which components can be mounted. The housing 102 also illustratively includes an enclosure that is provided to protect components mounted to the frame structure The portable power source 100 can also include a transport assembly 104 that can facilitate the movement, transport, and/or repositioning of the portable power source 100. In the illustrated embodiment, the transport assembly 104 includes a plurality of wheels 106 (shown as a pair of wheels 106), and a trailer hitch 108. In other embodiments, the portable power source 100 may not have wheels, or may have more than two wheels. In yet other embodiments, the portable power source 100 can be positioned on a trailer.

The portable power source 100 also includes an aperture 110 in the housing 102. A door 112 is configured to cover the aperture 110, while selectively providing a user access to components inside the enclosure 110. The door 112 can be pivotally mounted to the housing 102, for example by one or more hinges. Various housings can be employed without departing from the scope of the invention discussed in this disclosure and unless specifically stated otherwise in this disclosure, features of a particular housing are not considered part of any invention disclosed herein.

The portable power source 100 has a generator 200 mounted in the housing 102 and operable to generate electrical power. In some embodiments, the generator 200 can have a power rating between about 20 KVA to about 625 KVA, with larger or smaller power ratings being possible. The generated electrical power can be a single phase or a three-phase alternating current (AC) electrical power at a desired voltage and frequency. For example, in the illustrated embodiment, the generator 200 can produce three different types of output voltages: 480 Volt (or "V") three-phase electrical power, 208/240 V three-phase electrical power, and 120/240 V single-phase electrical power. In other embodiments, the generator 200 can produce any number or desired types of output voltages. The generator 200 can also include one or more transformers (not shown) to facilitate an output of current at multiple desired voltages. In another example of an embodiment, the generator 200 can be configured to provide electrical power as a direct current (DC) power supply at a desired voltage.

Figure 2:
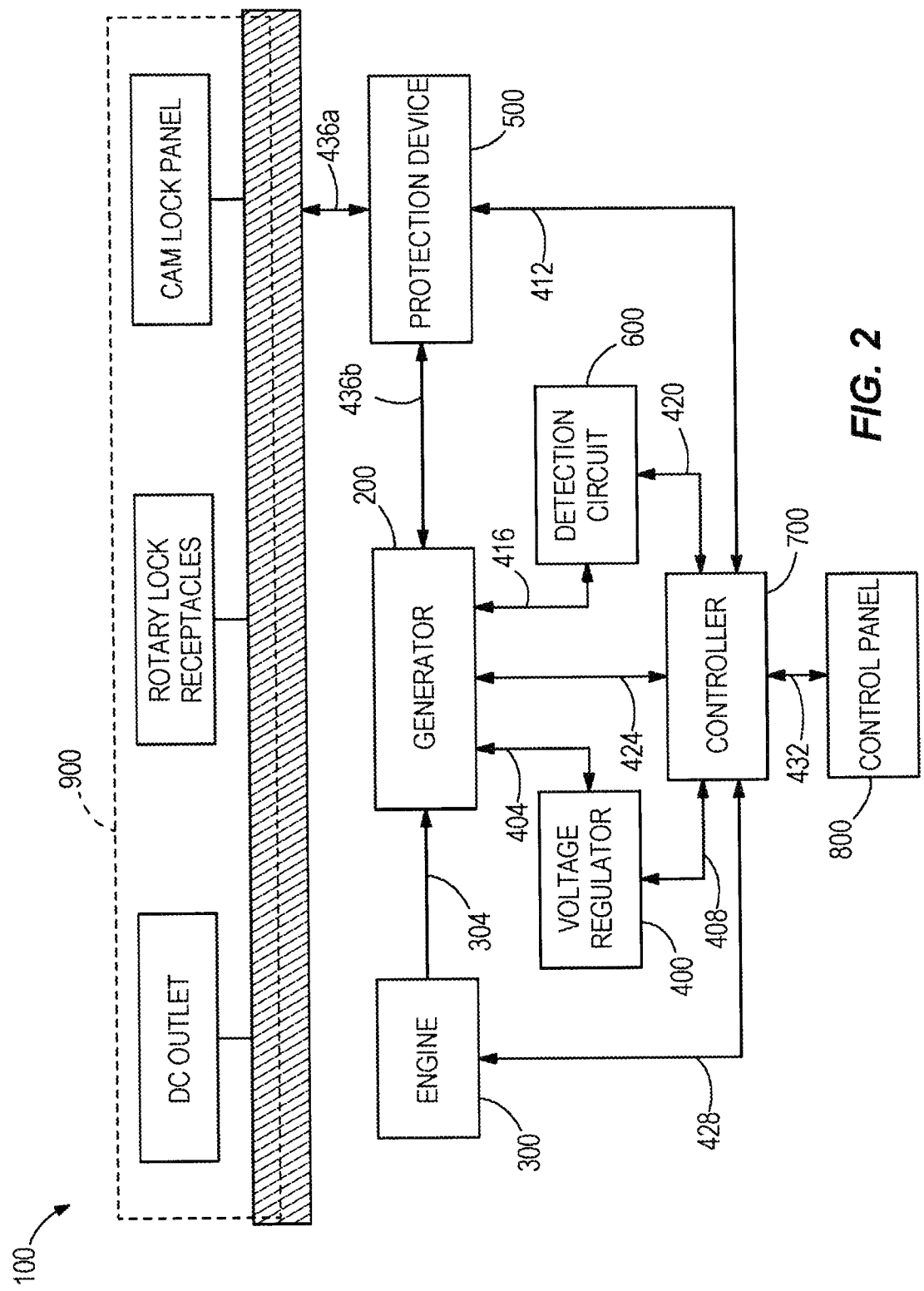
FIG. 2 is a schematic view of the portable power source illustrated in FIG. 1.

With reference to FIG. 2, components of the portable power source 100 include the generator 200 and a prime mover 300 operably coupled to the generator to provide power to the generator. A voltage regulator 400 is in electrical communication with the generator and is configured to provide output for adjusting the generator 200, and more specifically adjusting the electromagnetic field of the generator 200 to provide a power output with a constant voltage. A protection device 500 such as a circuit breaker is operably connected (or coupled) to the generator 200 downstream thereof and is configured to halt operation of the portable power source 100 (i.e., the generator) to protect the portable power source 100 and the connected equipment from potential damage. A detection circuit 600 is provided to verify that an appropriate protection parameter is used in associated with the selected power output setting. A controller 700 is communication with the generator 200, the prime mover 300, the voltage regulator 400, the protection device 500, and the detection circuit 600. In addition, a control panel 800 is in communication with the controller to allow an operator to provide inputs to the controller 700. An output panel 900 is provided as a power output interface. The combination of the generator 200 and the engine 300 (or prime mover 300), and the associated components described in this paragraph can be referred to as a generator set (or genset).

The prime mover 300 of FIG. 2 is an engine and more specifically a reciprocating piston engine (e.g., an internal combustion, compression-ignition engine, etc.). The engine 300 is also coupled to a fuel source and an exhaust system. The engine 300 includes various mechanical components (e.g., pistons, cylinders, crankshaft, etc.) that allow the engine 300 to convert fuel energy to mechanical energy. The engine 300 receives fuel energy from the fuel source (or a fuel storage or a fuel tank) (not shown). In the illustrated embodiment, the engine 300 uses diesel fuel to generate mechanical energy. In other embodiments, the engine 300 can utilize different types of fuel, for example, gasoline, vegetable oil, butane gas, propane gas, natural gas, or the like. In other embodiments, the engine 300 can utilize a plurality of fuel sources, for example propane gas and natural gas. As combustion occurs in the cylinders of the engine 300, a drive shaft 304 (or crankshaft 304) rotates in response to the movement of the pistons, and the engine 300 generates mechanical energy. The drive shaft 304 is coupled to the generator 200, and rotation of the drive shaft 304 drives the generator 200 to produce electrical power. Any exhaust gases or excess air generated by the engine 300 is expelled through an exhaust system (not shown). In some embodiments, the portable power source 100 includes an exhaust processing system that treats the exhaust gas from the engine 300 before releasing the exhaust material to the atmosphere. The housing 102 can also include one or more openings (or exhaust vents) that facilitate the release of exhaust material to the atmosphere. While the illustrated embodiment depicts the prime mover 300 as a reciprocating piston internal combustion engine, in other embodiments, the prime mover 300 can be any engine suitable to drive the generator 200.

The generator 200 receives mechanical energy from the engine 300 through the drive shaft 304 and converts the mechanical energy to an electrical output through magnetic induction. The generator 200 includes a stator (not shown) and a rotor (not shown). The rotor is coupled to the drive shaft 304 of the engine 300. The rotor rotates with the rotation of the drive shaft 304. The rotor can include a plurality of conductive coils wound around an iron core. The stator includes a plurality of conductive coils (not shown) wound onto an outer casing of the generator 200. The conductive coils can be manufactured out of copper. However, in other embodiments, any suitable conductive material can be used for the conductive coils. As current passes through the conductive coils of the rotor, the coils of the rotor create an electromagnetic field. As the rotor rotates (due to the rotation of the drive shaft 304) the electromagnetic field cuts across the plurality of conductive coils of the stator and generates a current on the stator coils thereby providing the electrical output. An example of the generator 200 and associated rotor and stator is disclosed in U.S. Pat. No. 9,641,112, the contents of which is hereby incorporated by reference in its entirety.

The stator coils can be connected in different configurations to allow the generator 200 to provide power outputs at different voltage levels. For example, the stator can include six wound coils to provide a three-phase power output. Each power phase combines two stator coils in either series or parallel. The six stator coils can be selectively arranged in a first configuration to provide single-phase power, a second configuration to provide three-phase power at a first voltage level, and a third configuration to provide two different three-phase power outputs at a second voltage level and a third voltage level, respectively. By changing the connections between the stator coils between different configurations, the generator 200 provides the electrical output at different voltage levels. In the above example, changing the connections between the stator coils between three different configurations, the generator 200 can provide the electrical output at four different voltage levels. In one embodiment, the second configuration provides three-phase power at about 480 volts and the third configuration provides a three-phase power output at about 208 volts and a three phase power output at about 240 volts.

The generator 200 can output an alternating current due to oscillation of the electromagnetic field in the generator 200. The peaks of the output alternating current increases with a stronger electromagnetic field. Analogously, as the strength of the electromagnetic field decreases, the peaks of the output alternating current decrease. The voltage regulator 400 is configured to condition the alternating power from the generator 200 to provide an electrical output with a consistent voltage level.

With continued reference to FIG. 2, the voltage regulator 400 is operably connected to the generator 200 by a first communication link 404. First communication link 404 and other communication links described below can be a wired or wireless link, a communication bus, or any other suitable communication device for the transfer of data, commands, and/or other information between components. The voltage regulator 400 is also operably connected to (or in communication with) the controller 700 by a second communication link 408. The voltage regulator 400 can adjust the electromagnetic field by, for example, adjusting a control voltage of the generator 200. The voltage regulator 400 changes the electromagnetic field of the generator 200 in response to the load experienced by the generator 200. Therefore, the generator 200 provides a power output with a constant voltage level even when an electrical load fluctuates. As an example, during periods of high electrical demand, the voltage level of the electrical output from the generator 200 can decrease. In response to such situations, the voltage regulator 400 increases the strength of the electromagnetic field of the generator 200 so the generator 200 compensates for the high load. As another example, when electrical demand is low, the voltage level of the electrical output from the generator 200 can increase. In response to such situations, the voltage regulator 400 can decrease the strength of the electromagnetic field of the generator 200 so the generator 200 compensates for the low load.

The protection device 500 is operably connected to (or in communication with) the controller 700 by a third communication link 412. If the actual power output from the generator 200 exceeds any of the protection parameters, the controller 700 is configured to responsively send a signal to the protection device 500 to halt operation of the portable power source 100 to protect the portable power source 100 and the connected equipment from potential damage. In the illustrated embodiment, the protection device 500 can disconnect the generator 200 from the load (e.g., any equipment connected by the output panel 900, etc.) to inhibit the generator 200 from providing power. The protection device 500 and/or the controller 700 can also be configured to shut down (or terminate operation of) the engine 300, the generator 200, or both, in order to inhibit the generator 200 from producing the electrical output.

The detection circuit is operably connected to (or in communication with) the generator 200 by a fourth communication link 416. The detection circuit 600 is coupled (or in communication with) at least one stator coil of the generator 200. The detection circuit 600 is also operably connected to (or in communication with) the controller 700 by a fifth communication link 420. The detection circuit 600 can be provided to verify that an appropriate protection parameter is used in associated with the selected power output setting and associated voltage level. More specifically, the detection circuit 600 is configured to analyze the voltages at the connections with the stator coils to determine the stator coils arrangement (e.g., in what configuration the stator coils are arranged, etc.). The detection circuit 600 is also configured to analyze the state of a voltage selector control 1000 (or a user power selector) to determine the selected power output and associated voltage level (e.g., the first configuration to provide single-phase power, the second configuration to provide a three-phase low power output at the first voltage level, the third configuration to provide two different three-phase power outputs at the second and third voltage levels, etc.).

The controller 700 is operably connected to (or in communication with) the generator 200 by a sixth communication link 424. The controller 700 is also operably connected to (or in communication with) the prime mover 300 by a seventh communication link 428. The controller 700 is configured to provide operational controls to the generator 200. Further, the controller 700 is configured to provide operation controls to the engine 300. In other examples of embodiments, the controller 700 can be separated into a generator controller and an engine controller.

The control panel 800 is operably connected to (or in communication with) the controller 700 by an eighth communication link 432. The control panel 800 provides input and output elements for a user (or operator) of the portable power source 100 to control and monitor operation of the power source 100. The control panel 800 can include a voltage selector control 1000 (shown in FIG. 3). The control panel 800 can also include an On/Off actuator that is configured to power the portable power source 100 on or off, one or more measurement gauges or interfaces (e.g., devices to monitor one or more parameters of the portable power source 100, etc.), or any other suitable actuator, switch, control, gauge, or monitoring device to allow the user to operate the portable power source 100 and/or to monitor operation or performance of the portable power source 100. The control panel 800 can include a user interface system that allows a user to input commands and monitor output signals. For example, an input command can include, but is not limited to, a system start signal, a system stop signal, and/or a voltage setting for the generator 200. An output signal can include, but is not limited to, a voltage indication, a frequency indication, system and/or equipment temperatures, operating speed, and/or warning indicators.

The output panel 900 is positioned downstream of the generator 200. Electrical power generated by the generator 200 flows to the output panel 900 through a power supply connection 436. In the illustrated embodiment, the output panel 900 is operably connected to (or coupled to, or in communication with) the protection device 500 by a first power supply connection 436a. The generator 200 is operably connected to (or coupled to, or in communication with) the protection device 500 by a second power supply connection 436b. The first and second power supply connections 436a, 436b combined to form the power supply connection 436.

The output panel 900 can include one or more different connectors and/or interfaces to connect different types of equipment to the portable power source 100. For example, in some embodiments, the output panel 900 includes a cam lock panel with a plurality of cam lock connectors, one or more DC outlets that are configured to provide DC power to different types of equipment, and one or more rotary lock receptacles. The one or more cam lock connectors can provide access to the various voltage levels that may be configured as described above. For example, the connectors may provide access to at least one low voltage output and at least one high voltage output. More specifically, in some embodiments, the cam lock connectors can provide access to two low voltage outputs and one high voltage output. In other embodiments, the output panel 900 can include various output conductors that are configured to be attached to a load. As a non-limiting example, the conductors can include, but are not limited to cam lock connectors, rotary lock connectors, power receptacles (e.g., ground-fault circuit interrupter (GFCI), etc.), or any other suitable or available type of conductor that is configured to make a suitable single phase or suitable three-phase power connection.

In the illustrated embodiment, the control panel 800 and the output panel 900 are mounted in the housing 102. Thus, the control panel 800 and the output panel 900 can be accessed by the user in the enclosure housing 102, and can be protected from environmental conditions (e.g., dirt, dust, rain, snow, etc.) by the door 112. While the control panel 800 and the output panel 900 can be positioned adjacent to each other, in other embodiments, the control panel 800 and the output panel 900 can be positioned at separate locations within the housing 102 (e.g., spaced apart, etc.).

Figure 3:
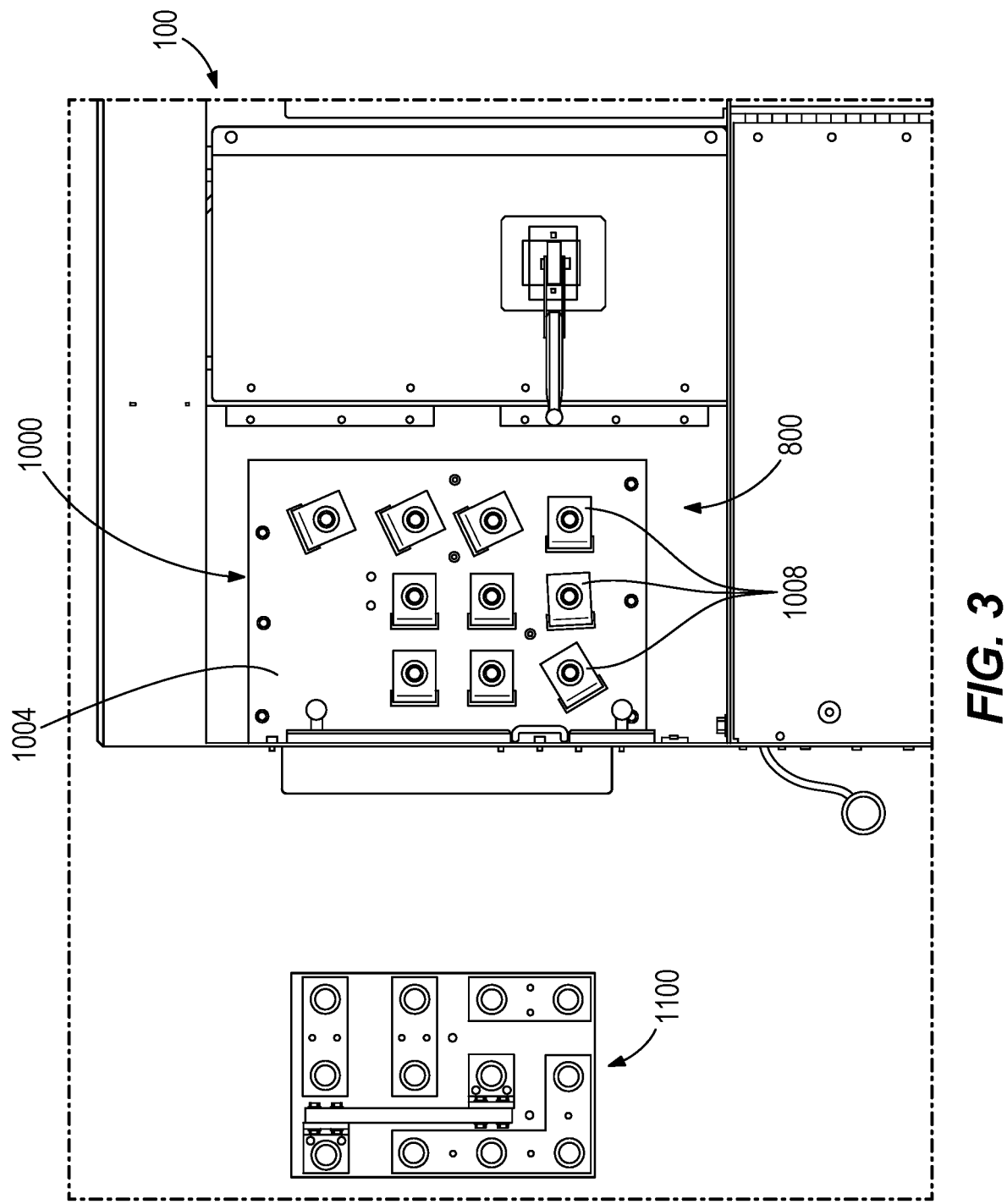
FIG. 3 is a perspective view of a portion of the portable power source shown in FIG. 1, illustrating a link board assembly selectively detached from a link board of a voltage selector control.

With reference now to FIG. 3, a perspective view of a portion of the portable power source 100, and specifically a portion of the control panel 800, is illustrated. A portion of the control panel 800 is removed (or opened) to provide access to the voltage selector control 1000. The voltage selector control 1000 controls the voltage level of the power output from the generator 200 by allowing the user (or operator) to select (or otherwise determine) an associated stator coil arrangement (e.g., in what configuration the stator coils are arranged, etc.). Stated another way, the voltage selector control 1000 allows the user to select the generator 200 configuration to facilitate the portable power source 100 to supply a desired power output and associated voltage level. For example, the use can select the first configuration to facilitate the portable power source 100 to provide single-phase power, the second configuration to facilitate the portable power source 100 to provide three-phase low power output at the first voltage level, and/or the third configuration to facilitate the portable power source 100 to provide two different three-phase power outputs at the second and third voltage levels.

The voltage selector control 1000 includes a first, non-removable link board 1004 that is mounted to the housing 102. The link board 1004 is a non-conductive board that includes (or carries) a plurality of conductive studs 1008 (or contacts 1008). The studs 1008 are each fastened (or mounted) to the link board 1004. Each of the studs 1008 projects away (or extends away) from the link board 1004. In the illustrated embodiment, the link board 1004 includes twelve studs 1008. The studs 1008 are arranged in a four by three (4×3) arrangement (or four rows of three studs). In other embodiments, any suitable number of the studs 1008 can be mounted to the link board 1004. Further, in other embodiments, the studs 1008 can be provided in any suitable arrangement on the link board 1004. The link board 1004 forms an electrical connection between the generator 200 and the output panel 900 to facilitate the generation and distribution of the selected power output and associated voltage level. Stated another way, the voltage selector control 1000 facilitates a change to the connections between the stator coils of the generator 200 (or adjusts the alternator) to change the output electrical power. For example, the link board 1004 can facilitate a connection between an alternator associated with the generator 200 and the output panel 900. By changing an electrical connection between the studs 1008, the associated power output configuration of the generator 200 (e.g., the first configuration to provide single-phase power, the second configuration to provide a three-phase low power output at the first voltage level, the third configuration to provide two different three-phase power outputs at the second and third voltage levels can be selected, generated, and distributed.

A link board assembly 1100 is configured to selectively engage the first, non-removable link board 1004 of the voltage selector control 1000. The link board assembly 1100 facilitates a pre-selected electrical connection between the studs 1008 associated with one of the power output configurations of the generator 200. The link board assembly 1100 is configured to be selectively installable and/or removable by a user (or operator) to easily and efficiently select the desired power output configuration of the generator 200.

Figure 4:
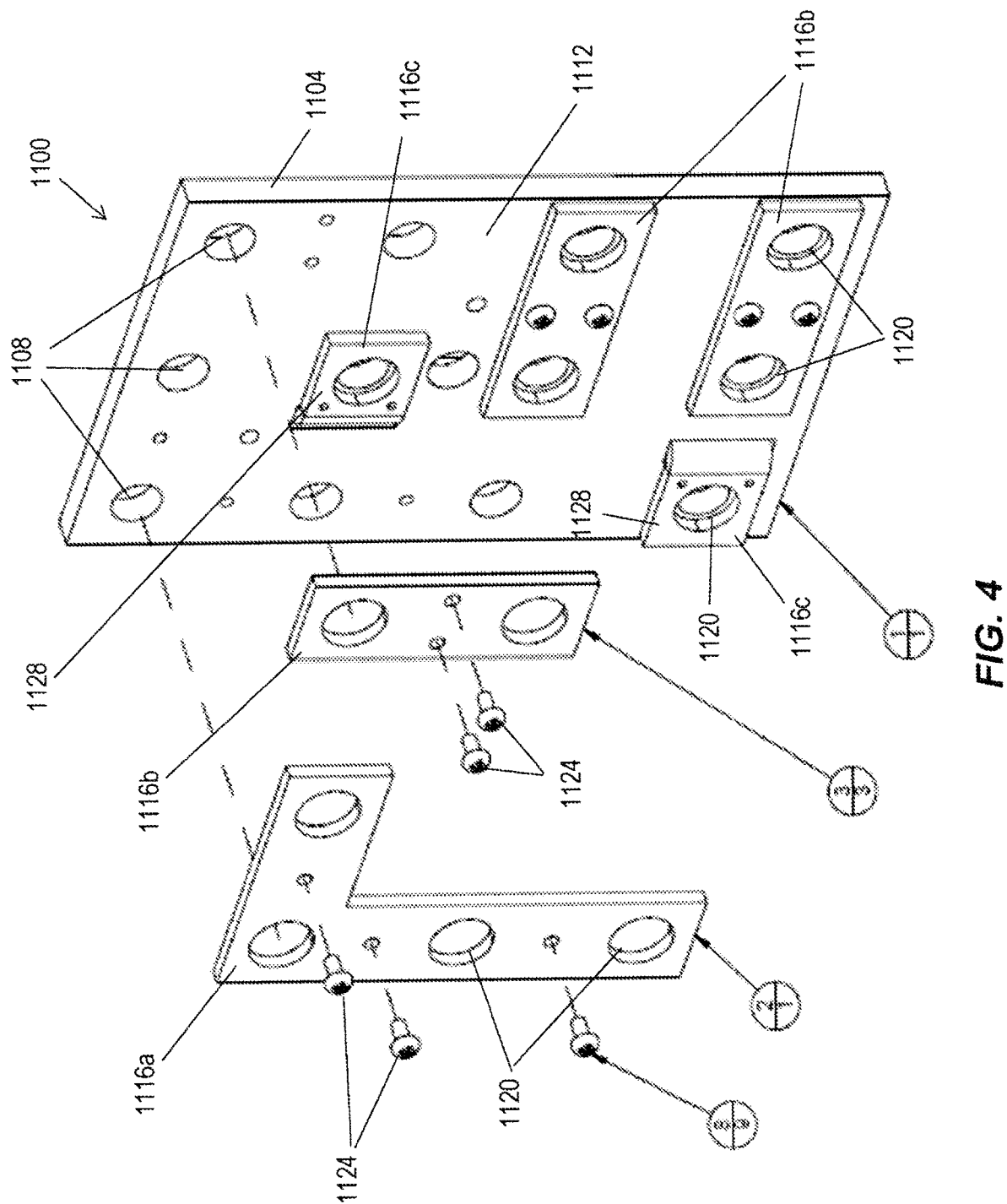
FIG. 4 is a partially exploded view of a first side of the link board assembly of FIG. 3.
Figure 5:
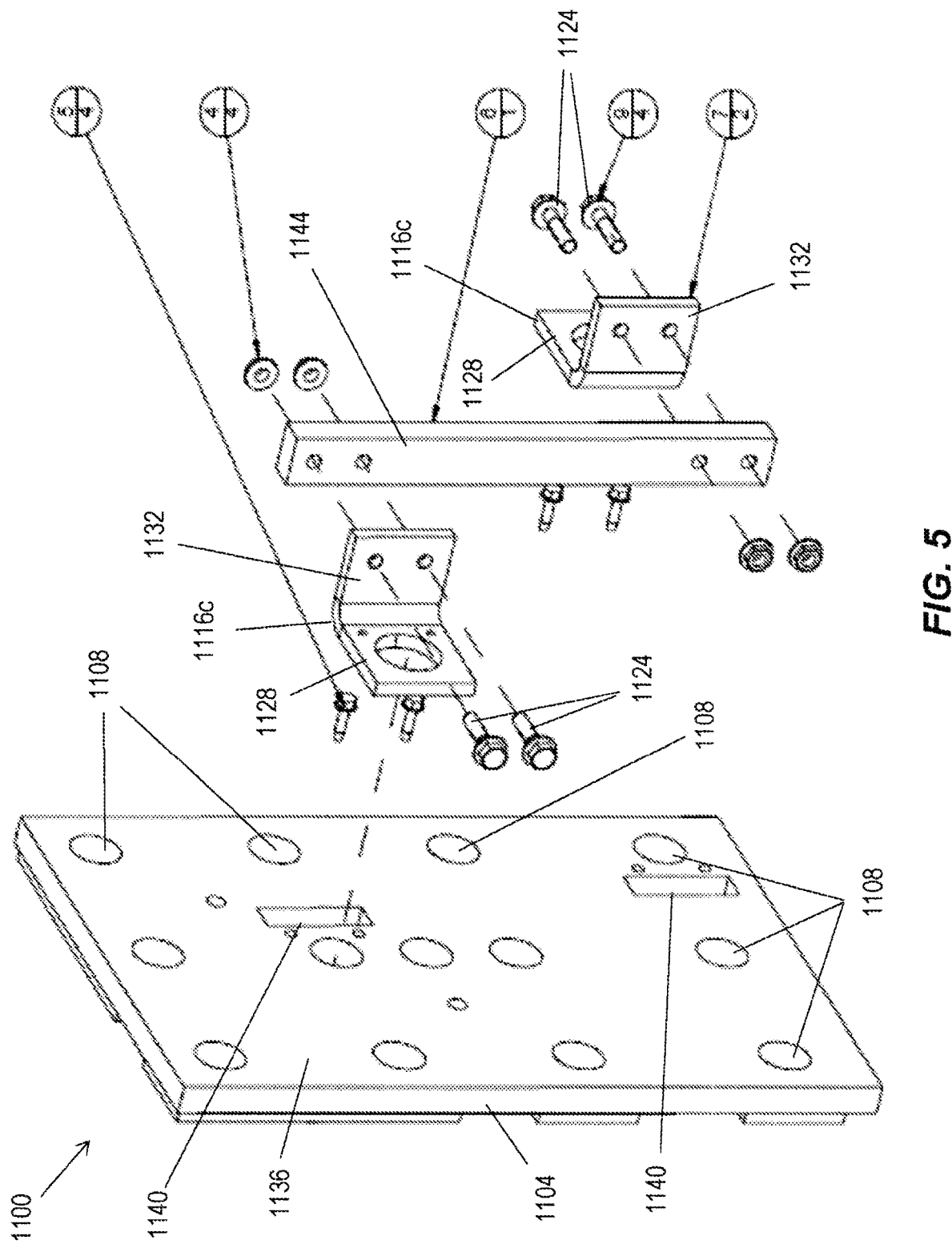
FIG. 5 is a partially exploded view of a second, opposite side of the link board assembly of FIG. 3.

With reference to FIGS. 4-5, the link board assembly 1100 is illustrated in a partially exploded view. The link board assembly 1100 includes a non-conductive base board 1104. The base board 1104 includes a plurality of apertures 1108 that extend entirely through the base board 1104. The apertures 1108 are sized and spaced to correspond to the conductive studs 1008 of the link board 1004. More specifically, each aperture 1108 is configured to receive one of the conductive studs 1008. Accordingly, the number of apertures 1108 and arrangement of the apertures 1108 on the base board 1104 corresponds to the associated number of conductive studs 1008 and arrangement of the studs 1008 on the link board 1004.

With specific reference to FIG. 4, a first side 1112 of the link board assembly 1100 is illustrated. A plurality of conductive bus bars 1116 are configured to be fastened to the base board 1104. The conductive bus bards 1116 include a first bus bar 1116a, a plurality of second bus bars 1116b, and a plurality of third bus bars 1116c.

The first bus bar 1116a includes a plurality of apertures 1120. When the first bus bar 1116a is fastened to the base board 1104, each aperture 1120 is configured to align with one of the associated apertures 1108 of the base board 1104. The first bus bar 1116a illustratively includes four apertures 1120 and is arranged to form an angle. Other configurations are possible and this particular configuration should not be seen as limiting. The first bus bar 1116a is configured to be fastened to the base board 1104 by at least one fastener 1124 (e.g., a screw, a bolt, a bolt and nut, etc.). In the illustrated embodiment, a plurality of fasteners 1124 facilitate fastening of the first bus bar 1116a to the base board 1104.

Each of the second bus bars 1116b includes a plurality of apertures 1120. When the second bus bar 1116b is fastened to the base board 1104, each aperture 1120 is configured to align with one of the associated apertures 1108 of the base board 1104. The second bus bar 1116b includes two apertures 1120. The second bus bar 1116b is configured to be fastened to the base board 1104 by at least one fastener 1124 (e.g., a screw, a bolt, a bolt and nut, etc.). In the illustrated embodiment, a plurality of fasteners 1124 facilitate fastening of the second bus bar 1116b to the base board 1104.

Each of the third bus bars 1116c includes a single aperture 1120. When the third bus bar 1116c is fastened to the base board 1104, the aperture 1120 is configured to align with one of the associated apertures 1108 of the base board 1104. With reference to FIG. 5, the third bus bar 1116c includes a first portion 1128 and a second portion 1132. The first portion 1128 is positioned on the first side 1112 of the base board 1104 and includes the aperture 1120 (see FIG. 4), while the second portion 1132 extends through the base board 1104 and projects out a second side 1136 of the base board 1104. More specifically, the second portion 1132 extends through a respective slot 1140 extending through the base board 1104. In the illustrated embodiment, the first portion 1128 is oriented orthogonal to (or perpendicular to) the second portion 1132.

The second portions 1132 of the third bus bars 1116c are connected by a raised bus bar 1144. More specifically, the raised bus bar 1144 electrically connects the third bus bars 1116c. The electrical connection by the raised bus bar 1144 is on the second side 1136 of the base board 1104. The raised bus bar 1144 is fastened to the third bus bars 1116c, and more specifically to the second portions 1132 of the third bus bars 1116c by at least one fastener 1124 (e.g., a screw, a bolt, a bolt and nut, etc.). In the illustrated embodiment, a plurality of fasteners 1124 facilitate fastening of the second bus bar 1116b to the base board 1104.

The first and second bus bars 1116a, 1116b are configured to electrically connect studs 1008 that are arranged next to each other on the link board 1004. The third bus bars 1116c are configured to electrically connect studs 1008 that are spaced apart from each other (e.g., are not next to or adjacent to each other, are in different rows and/or columns on the link board, etc.).

While the illustrated embodiment depicts one first bus bar 1116a, three second bus bars 1116b, and two third bus bars 1116c, any suitable number and type of bus bars 1116 can be used to electrically connect the studs 1008 in a desired orientation to select the desired power output configuration of the generator 200.

The link board assembly 1100 shown in FIGS. 4-5 is one embodiment of a link board assembly 1100. More specifically, the illustrated embodiment of the link board assembly 1100 is configured to selectively arrange the stator coils of the generator 200 (or adjust the alternator) in the first configuration to provide single-phase power (or 120/240 V single-phase electrical power). Other embodiments of the link board assembly 1100 can include a different combination and/or orientation of bus bars 1116 to selectively arrange the stator coils of the generator 200 (adjust the alternator) in a different configuration to provide different output electrical power. For example, another link board assembly 1100 can be provided to selectively arrange the generator 200 stator coils (or adjust the alternator) in the second configuration. In addition, yet another link board assembly 1100 can be provided to selectively arrange the generator 200 stator coils (or adjust the alternator) in the third configuration. A plurality of link board assemblies 1100 can be provided as a set, with each different link board assembly 1100 facilitating a different arrangement of the generator 200 stator coils (or adjust the alternator) to one of the first, second, or third configuration.

In operation, a user (or operator) can selectively install a link board assembly 1100 associated with a desired power output configuration of the generator 200. As an example, the embodiment of the link board assembly 1100 shown in FIGS. 4-5 depicts a bus bar connection that will selectively arrange the generator 200 stator coils (or adjust the alternator) to the first configuration to produce 120/240 volt single-phase electrical power. The user (or operator) first gains access to the voltage selector control 1000. For example, in embodiments where the voltage selector control 1000 is associated with the control panel 800, the user can open the door 112 to access the control panel 800 positioned in the enclosure 110 of the portable power source 100. The user can then further proceed to access the voltage selector control 1000, for example by opening an additional cover to expose the non-removable link board 1004.

Once the user acquires access to the link board 1004, the user can remove the link board assembly 1100 that is in place. For example, the user can remove any fasteners attaching the link board assembly 1100 to the link board 1004 and remove the link board assembly 1100. Once the link board assembly 1100 is removed, or if no link board assembly 1100 is attached at the time of user access to the link board 1004, the user has access to the exposed link board 1004.

Next, the user can proceed to install (or attach or connect) the desired link board assembly 1100 to the link board 1004. More specifically, the user aligns the apertures 1108 of the base board 1104 with the studs 1008 protruding from the link board 1004. Once aligned, the user positions the link board assembly 1100 into engagement with the link board 1004 such that each stud 1008 is received by a corresponding aperture 1108 of the base board 1104. The user can then fasten the link board assembly 1100 to the link board 1004. For example, the user can use at least one fastener (e.g., a screw, a bolt, a bolt and nut, etc.) to fasten (or couple) the link board assembly 1100 to the link board 1004. Once fastened, the link board assembly 1100 is coupled to (or in engagement with) the link board 1004 of the voltage selector control 1000. Each stud 1008 is received in a corresponding aperture 1108 of the base board 1104. Further, each stud 1008 is also received in a corresponding aperture 1120 of one of the bus bars 1116 (or 1116*a*, 1116*b*, 1116*c*). The studs 1008 are electrically connected by the associated bus bars 1116 (or 1116*a*, 1116*b*, 1116*c*). The arrangement (or orientation) of the bus bars 1116 (or 1116*a*, 1116*b*, 1116*c*) and associated electrical connection of the studs 1008 facilitates the desired (or targeted) stator coil configuration (or alternator configuration) of the generator 200 to provide the desired power output configuration of the generator 200.

The disclosed link board assembly 1100 is mounted to the link board 1004 with the first side 1112 of the link board assembly 1100 facing the link board 1004. This is to provide room for the raised bus bar 1144 of the third bus bars 1116*c*, which is position on the second side 1136 of the link board assembly 1100. In other embodiments, the link board assembly 1100 can be mounted to the link board 1004 with the second side 1136 of the link board assembly 1100 facing the link board 1004 and raised bus bar 1144 of the third bus bars 1116*c* being positioned on the first side 1112 of the base board 1104.

The link board assembly 1100 for use with the portable power source 100 advantageously provides for improved selection and generation of a desired electrical output at different voltage levels. The link board assembly 1100 provides for easy handling and installation by a user (or an operator). Further, the link board assembly 1100 clearly orients the stator coil configuration (or alternator configuration) of the generator 200 to provide the desired power outputs at the desired voltage level. The power outputs at the desired voltage level cannot be inadvertently changed without user intervention to replace the link board assembly 1100.

Various additional features and advantages of the disclosure are set forth in the following claims.

What is claimed is:

1. A portable electrical generation system comprising:
   a generator having a rotor and a plurality of stators to produce a supply of electrical energy;
   a prime mover operable to drive the rotor;
   a voltage selector control operably connected to the generator; and
   a link board assembly configured to removably engage the voltage selector control, the link board assembly including a base board having a first side opposite a second side, and a plurality of bus bars fastened to the first side of the base board, at least a first bus bar and a second bus bar of the plurality of bus bars being electrically connected on the second side of the base board, the bus bars being arranged to electrically orient the plurality of stators to provide a first power output configuration.

2. The portable electrical generation system of claim 1, wherein the link board assembly is a first link board assembly configured to electrically orient the plurality of stators to provide the first power output configuration.

3. The portable electrical generation system of claim 2, wherein the first power output configuration is single-phase electrical power.

4. The portable electrical generation system of claim 2, wherein the first power output configuration is selected from one of single-phase electrical power, and three-phase voltage power at one of first, second and third levels.

5. The portable electrical generation system of claim 1, wherein the voltage selector control includes a non-removable board that carries a plurality of conductive studs, and the base board of the link board assembly defines a plurality of apertures, wherein in response to engagement with the voltage selector control each aperture of the link board assembly receives one of the plurality of conductive studs.

6. The portable electrical generation system of claim 5, wherein each bus bar includes an aperture that is configured to receive one of the plurality of conductive studs to electrically connect the conductive studs.

7. The portable electrical generation system of claim 6, wherein the electrical connection between the conductive studs facilitates the electrical orientation of the plurality of stators to provide the first power output configuration.

8. The portable electrical generation system of claim 1, wherein the first bus bar and the second bus bar each extend through the base board.

9. The portable electrical generation system of claim 8, wherein a raised bus bar electrically connects the first bus bar and the second bus bar on the second side of the base board.

10. The portable electrical generation system of claim 2, further comprising:
a second link board assembly configured to removably engage the voltage selector control, the second link board assembly including a base board having a first side opposite a second side, and a plurality of bus bars fastened to the first side of the base board, a first bus bar and a second bus bar being electrically connected on a second side of the base board, the bus bars being arranged to electrically orient the plurality of stators to provide a second power output configuration.

11. The portable electrical generation system of claim 10, wherein the first power output configuration is single-phase electrical power.

12. The portable electrical generation system of claim 11, wherein the first power output configuration is three-phase voltage power.

13. The portable electrical generation system of claim 10, wherein the second power output configuration is different than the first power output configuration.

14. The portable electrical generation system of claim 10, wherein one of the first link board assembly or the second link board assembly is configured to removably engage the voltage selector control.

15. The portable electrical generation system of claim 14, wherein in response to the first link board assembly in removable engagement with the voltage selector control, the plurality of stators are electrically oriented to provide the first power output configuration, and in response to the second link board assembly in removable engagement with the voltage selector control, the plurality of stators are electrically oriented to provide the second power output configuration.

16. A portable electrical generation system comprising:
a generator having a rotor and a plurality of stators to produce a supply of electrical energy;
a prime mover operable to drive the rotor;
a voltage selector control operably connected to the generator, the voltage selector control including a non-removable link board carrying a plurality of conductive studs; and
a first link board assembly configured to removably engage the non-removable link board of the voltage selector control, the first link board assembly including:
a first base board defining a plurality of first apertures, each first aperture is configured to receive one of the plurality of conductive studs, and
a plurality of bus bars fastened to a first side of the first base board, the bus bars configured to electrically connect the plurality of conductive studs to electrically orient the plurality of stators to provide a first power output configuration.

17. The portable electrical generation system of claim 16, further comprising: a second link board assembly configured to removably engage the non-removable link board of the voltage selector control, the second link board assembly including: a second base board defining a plurality of second apertures, each second aperture is configured to receive one of the plurality of conductive studs, and a plurality of bus bars fastened to a first side of the second base board, the bus bars configured to electrically connect the plurality of conductive studs to electrically orient the plurality of stators to provide a second power output configuration, wherein one of the first link board assembly or the second link board assembly is configured to removably engage the non-removable link board of the voltage selector control, and the first power output configuration is different than the second power output configuration.

18. The portable electrical generation system of claim 17, further comprising: a third link board assembly configured to removably engage the non-removable link board of the voltage selector control, the third link board assembly including: a third base board defining a plurality of third apertures, each third aperture is configured to receive one of the plurality of conductive studs, and a plurality of bus bars fastened to a first side of the third base board, the bus bars configured to electrically connect the plurality of conductive studs to electrically orient the plurality of stators to provide a third power output configuration, wherein one of the first link board assembly, the second link board assembly, or the third link board assembly is configured to removably engage the non-removable link board of the voltage selector control, and the third power output configuration is different than the first power output configuration and the second power output configuration.

19. A portable electrical generation system comprising:
a generator having a rotor and a plurality of stators to produce a supply of electrical energy;
a prime mover operable to drive the rotor;
a voltage selector control operably connected to the generator; and
one of a first link board assembly or a second link board assembly configured to separately removably engage the voltage selector control,
wherein in response to engagement of the first link board assembly with the voltage selector control, the first link board assembly is configured to adjust the generator to produce a first power output configuration, and
wherein in response to engagement of the second link board assembly with the voltage selector control, the second link board assembly is configured to adjust the generator to produce a second power output configuration different than the first power output configuration.

20. The portable electrical generation system of claim 19, further comprising a third link board assembly configured to separately removably engage the voltage selector control, wherein in response to engagement of the third link board assembly with the voltage selector control, the third link board assembly is configured to adjust the generator to produce a third power output configuration different than the first power output configuration and the second power output configuration.

* * * * *